UNITED STATES PATENT OFFICE.

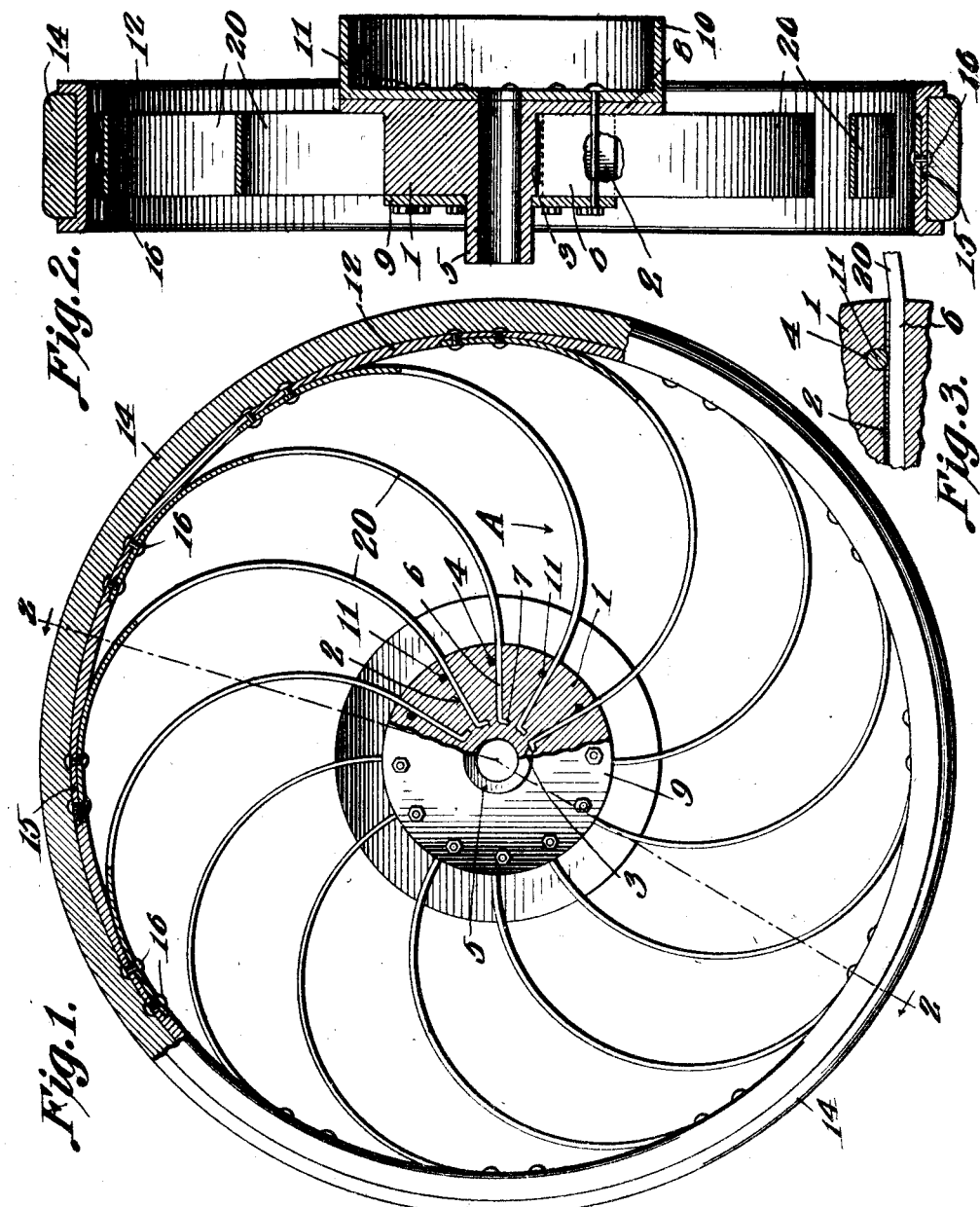

JAMES CLINTON AWALT AND THOMAS FREDERICK STEVENS, OF BRAMAN, OKLAHOMA.

AUTOMOBILE-WHEEL.

1,140,560.  Specification of Letters Patent.  Patented May 25, 1915.

Application filed September 12, 1914. Serial No. 861,403.

*To all whom it may concern:*

Be it known that we, JAMES C. AWALT and THOMAS F. STEVENS, citizens of the United States, residing at Braman, in the county of Kay, State of Oklahoma, have invented a new and useful Automobile-Wheel, of which the following is a specification.

The device forming the subject matter of this application is a resilient wheel and one object of the invention is to provide a device of this type in which pneumatic tires and other like elements subject to puncture may be dispensed with.

Another object of the invention is to provide novel means for assembling the spring spokes of the wheel with the hub thereof.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows in side elevation, a resilient wheel embodying the present invention, parts being broken away; Fig. 2 is a cross section on the line 2—2 of Fig. 1; Fig. 3 is a sectional detail enlarged from Fig. 1.

In carrying out the present invention there is provided a solid annular hub 1 preferably fashioned from metal. Extended transversely of the hub 1 are slots 2 which are disposed in approximately radial relation with respect to the center of the hub. The slots 2 at their inner ends are extended to form circumferentially disposed pockets 3.

Adjacent its perimeter, the hub 1 is provided with a plurality of openings or recesses 4 of circular contour, these recesses opening into the slots 2 as clearly shown in Fig. 3. The hub 1 includes a laterally projecting tubular bearing 5, and an integral plate 8.

A plurality of curved, resilient spokes 20 are shown, the inner ends 6 of the spokes 20 being seated in the slots 2, the inner ends of the spokes terminating in angularly disposed fingers 7 which lie in the pockets 3.

A hub plate 9 is applied to one end of the hub 1 and to the hub plate 8 is applied a brake drum 10. Securing elements 11 which may be bolt and nut structures lie in the recesses 4 and connect the hub plate 9 with the drum 10. Thus the hub plate 9 is held in place to constitute a closure for the slots 2, the hub plate 9 engaging the edges of the spokes 20 to prevent transverse movement of the spokes in the hub 1.

The rim is shown at 12 and may carry a tire 14. The use of the tire 14, however, is optional, since the necessary resiliency will be afforded by the spring spokes 20. In its inner face, the rim 12 is provided with circumferentially disposed recesses 15 receiving the outer ends of the springs 20. The ends of the springs 20 abut against the end walls of the recesses 15. The springs may be held in place by means of securing elements 16 of any desired sort, the same engaging the rim 12.

The securing elements 11 exercise two functions. First they serve to hold the hub plate 9 in place, and secondly, since these securing elements 11 bear against the side faces of the spokes 20 as shown in Fig. 3, any lost motion, occasioned by reason of the fact that the inner ends 6 of the spokes 20 may fit somewhat loosely in the slots 2 will be taken up. It is to be observed that when the securing elements 11 are mounted in place in the hub 1, the spokes 20 will be crowded circumferentially, in the direction of the arrow A. Since the fingers 7 and the securing elements 11 lie upon opposite sides of the inner end 6 of the spokes 20, the insertion of the securing elements 11 into the hub 1 will cause the fingers 7 to be advanced into the pockets 3. The construction under consideration is such that any inequalities resulting from the process of manufacture will not result in a loose mounting in the inner ends 6 of the spokes 20 in the slots 2 of the hub.

All portions of the wheel, except the tire 14 (when the latter is used) are made of metal and a solid and substantial wheel is presented.

Having thus described the invention, what is claimed is:—

A vehicle wheel embodying a solid annular hub having a slot therein, the slot being terminated at its inner end in a circumferentially extended pocket and the walls of the slot being parallel between the periphery of the hub and the pocket, the hub having a recess opening into the slot, all portions of the recess lying upon the opposite side of the slot from the pocket; a spoke comprising a straight, parallel walled portion terminally mounted in the slot and including a finger lodged in the pocket; a hubplate applied to one end of the hub and constituting a closure for the slot and a spoke engaging means; a securing element mounted in the recess and projecting into the slot into engagement with the hub plate, the securing element bearing directly against the straight parallel walled portion of the spoke and constituting the sole means for holding the spoke against movement circumferentially of the hub in one direction and a rim assembled with the spoke the finger constituting the sole means for preventing the spoke from moving endwise.

In testimony that we claim the foregoing as our own, we have hereto affixed our signatures in the presence of two witnesses.

JAMES CLINTON AWALT.
THOMAS FREDERICK STEVENS.

Witnesses:
ROY ELMER NAYLOR,
JACOB C. PIPER.